July 15, 1924.  1,501,690
E. G. STRONG
DEVICE FOR BURNISHING SURFACES OF ROLLS FOR ROLLER BEARINGS
Filed June 5, 1922

Inventor:
Ernest G. Strong,
by Cain & Cain,
His Attorneys.

Patented July 15, 1924.

1,501,690

UNITED STATES PATENT OFFICE.

ERNEST G. STRONG, OF CANTON, OHIO, ASSIGNOR TO THE TIMKEN ROLLER BEARING COMPANY, OF CANTON, OHIO, A CORPORATION OF OHIO.

DEVICE FOR BURNISHING SURFACES OF ROLLS FOR ROLLER BEARINGS.

Application filed June 5, 1922. Serial No. 566,090.

*To all whom it may concern:*

Be it known that I, ERNEST G. STRONG, citizen of the United States, and a resident of the city of Canton, county of Stark, and State of Ohio, have invented a new and useful Improvement in Devices for Burnishing Surfaces of Rolls for Roller Bearings, of which the following is a specification.

My invention relates to devices for burnishing surfaces of rolls for roller bearings and the like and has for its principal object to provide means for burnishing such roll during a drilling or other operation, thereby eliminating the necessity for a separate burnishing operation.

The invention consists principally in providing the drill holder of an automatic screw machine or the like with a plurality of burnishing rollers adapted to engage the work during a portion of the drilling operation.

Rolls for roller bearings are commonly made by a series of operations on a bar of metal. The conical rolls ordinarily used in conical roller bearings have at their larger end a conical surface adapted to cooperate with the rib of a bearing cone. Ordinarily such inclined bearing surface is made by a grinding or cutting operation requiring a separate step in the process of making the roller and ordinarily requiring the use of an additional machine; but by the present invention such additional step is eliminated.

Figure 1:
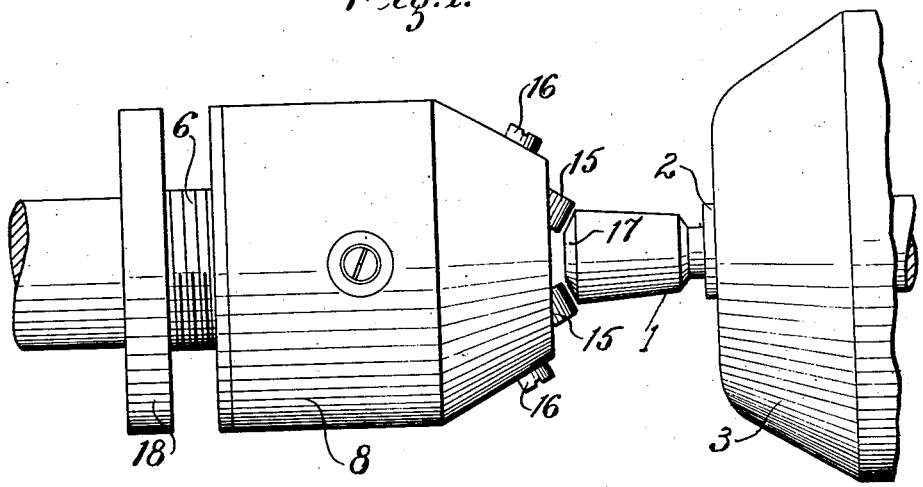
Figure 2:
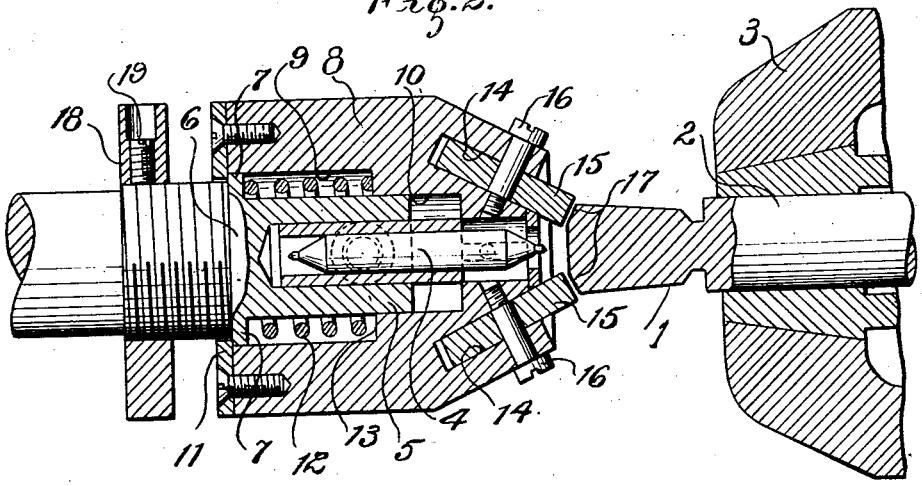

In the accompanying drawing, which forms part of this specification, and wherein like numerals refer to like parts wherever they occur, Fig. 1 is a side view, and Fig. 2 is a longitudinal central section of a burnishing device embodying my invention.

The roll 1 is formed on the end of a suitable bar 2. The bar is held in a suitable chuck 3 which is held against endwise movement, but is preferably rotated. A step in the maufacture of the roller comprises drilling a hole in the large end thereof. A drill punch or the like 4, is mounted in a suitable sleeve 5 that is disposed in an axial opening in the end of a spindle 6. The spindle 6 is fed forward by any suitable means to cause the drill 4 to engage the end of the roll.

The present invention lies in mounting on said spindle 6 means for burnishing the end of the roll, as hereinafter described.

The spindle 6 is provided with a circumferential rib 7 some distance from its end. A head 8 is mounted on the end of said spindle 6 and is provided with a bore 9 in which the circumferential rib 7 of the spindle fits and with a counter bore 10 in which the end of the spindle 6 fits. Thus the head 8 is centered on the end of the spindle 6 and capable of endwise movement thereon. Secured to the end of the head 8 is a washer 11, that engages the rib 7 of the spindle to prevent the head from coming off the spindle.

A coil spring 12 is mounted on the spindle 6 between the rib 7 of the spindle 6 and the offset portion 13 of the head. The spring 12 tends to keep the head 8 in its outermost position on the spindle 6.

The outer end of the head is provided with inclined slots 14 in which are rotatably secured burnishing rollers 15, as by cap screws 16, which have their axes intersecting inside of said head and in the axis thereof. These rollers 15 are disposed at the angle necessary to provide the proper angle for the conical surface 17 of the roll.

Mounted on the spindle 6 to the rear of the head 8 is a collar 18 that is adapted to engage the head and force it forward. Preferably the spindle is threaded so that the position of the collar 18 thereon may be adjusted. A set screw 19 is provided for securing the collar 18 in any desired position.

The operation of the device is as follows:

Assuming that the parts are in the position shown in the drawing, the whole device is fed forward toward the roll 1. The burnishing rollers 15 engage the roll and, as the device is rotated, the rollers burnish the end of the roll slightly and shape the conical bearing surface. After the burnishing rollers 15 are in engagement with the roll 1, the spindle 6 continues to be fed forward against the pressure of the spring 12 until the drill 4 engages the end of the roll 1 and makes a hole therein. At the end of the forward movement of the spindle, the collar 18 thereon engages the end of the head 8 and forces the head against the end of the roll thus completing the operation.

The device illustrated burnishes the end of the roll accurately and expeditiously. The grinding operation ordinarily required for polishing a thrust bearing surface of the roll is eliminated and thus the expense of making the roll is cut down. Likewise, the burnished bearing surface is much more satisfactory than the surface resulting from the ordinary operation.

Obviously, numerous changes may be made without departing from the invention and I do not wish to be limited to the precise construction shown.

What I claim is:

1. A device for smoothing rolls for roller bearings, comprising a rotatable head and a plurality of rollers mounted in said head and conically disposed about the axis thereof, said rollers projecting beyond the end of said head and the axes thereof intersecting inside of said head.

2. A device for smoothing the ends of rolls, comprising a rotatable head, a plurality of rollers rotatably mounted in said head and projecting beyond the end thereof, the axes of said rollers intersecting inside of said head, means for holding an unfinished roll in position to be operated on by said smoothing rollers, said head being adapted and arranged for axial movement.

3. A device for smoothing the ends of rolls, comprising a spindle, a head slidably mounted on said spindle, a plurality of rollers in said head conically disposed about the axis of said spindle and projecting from said head, the axes of said rollers intersecting inside of said head, means for holding an unfinished roll in position to be operated on by said smoothing rollers, said head being adapted and arranged for axial movement.

4. A device for smoothing the ends of rolls, comprising a spindle, a head slidably mounted on said spindle, a spring interposed between said head and said spindle and adapted to keep said head in its outermost position on said spindle, a plurality of rollers in said head conically disposed about a common center and projecting from said head, means for holding an unfinished roll in position to be operated on by said smoothing rollers, said head being adapted and arranged for axial movement.

5. In combination with a drill or the like, a device for smoothing rolls for roller bearings, comprising a plurality of rollers conically disposed about a common center, and means for holding a roll in position to be operated on by said rollers, said rollers being adapted for bodily movement toward the roll to be smoothed.

6. In combination with means for drilling a hole in the end of a roll, a device for smoothing the ends of rolls, comprising a head, a plurality of rollers in said head conically disposed about a common center and projecting from said head, means for holding an unfinished roll in position to be operated on by said smoothing rollers, and means for holding an unfinished roll in position to be operated on by said smoothing rollers, said head being adapted and arranged for axial movement.

Signed at Canton, Ohio, this 31st day of May, 1922.

ERNEST G. STRONG.